(12) United States Patent
Neulen et al.

(10) Patent No.: US 12,371,031 B2
(45) Date of Patent: Jul. 29, 2025

(54) TECHNOLOGY FOR DEAD TIME COMPENSATION DURING TRANSVERSE AND LONGITUDINAL GUIDANCE OF A MOTOR VEHICLE

(71) Applicant: MAN Truck & Bus SE, Munich (DE)

(72) Inventors: Tobias Neulen, Munich (DE); Stefan Gritsch, Munich (DE); Arne-Christoph Hildebrandt, Munich (DE); Sven Kraus, Munich (DE); Peter Strauss, Munich (DE)

(73) Assignee: MAN Truck & Bus SE, Munich (DE)

( * ) Notice: Subject to any disclaimer, the term of this patent is extended or adjusted under 35 U.S.C. 154(b) by 168 days.

(21) Appl. No.: 17/766,460

(22) PCT Filed: Sep. 29, 2020

(86) PCT No.: PCT/EP2020/077178
§ 371 (c)(1),
(2) Date: Apr. 4, 2022

(87) PCT Pub. No.: WO2021/063918
PCT Pub. Date: Apr. 8, 2021

(65) Prior Publication Data
US 2024/0067185 A1    Feb. 29, 2024

(30) Foreign Application Priority Data
Oct. 4, 2019  (DE) .................. 10 2019 006 935.8

(51) Int. Cl.
*B60W 40/107*  (2012.01)
*B62D 5/04*  (2006.01)
(Continued)

(52) U.S. Cl.
CPC ......... *B60W 40/107* (2013.01); *B62D 15/021* (2013.01)

(58) Field of Classification Search
None
See application file for complete search history.

(56) References Cited

U.S. PATENT DOCUMENTS

| | | | |
|---|---|---|---|
| 10,829,149 B1 * | 11/2020 | Garimella | B62D 6/001 |
| 2019/0392715 A1 * | 12/2019 | Strauß et al. | G08G 1/22 |
| 2021/0032850 A1 * | 2/2021 | Holl | E02F 9/265 |

FOREIGN PATENT DOCUMENTS

| | | |
|---|---|---|
| CN | 102574526 A | 7/2012 |
| CN | 108073071 A | 5/2018 |

(Continued)

OTHER PUBLICATIONS

Notice of First Examination Opinion issued in Chinese Patent Application No. 202080069276.9 dated Feb. 5, 2024 with English translation.

(Continued)

*Primary Examiner* — Angela Y Ortiz
*Assistant Examiner* — Laura E Linhardt
(74) *Attorney, Agent, or Firm* — Weber Rosselli & Cannon LLP

(57) ABSTRACT

A technique for determining and compensating for a dead time of at least one actuator for lateral guidance or longitudinal guidance of a motor vehicle includes a device including at least one sensor or at least one sensor interface for detecting at least one actual value of a state of motion of the lateral guidance or longitudinal guidance. A unit of determination of the device is configured to determine the dead time of at least one actuator by comparing at least one target value of the state of motion calculated from a dynamic model with the recorded at least one actual value. A control unit of the device is configured to control the actuator depending on the detected state of motion and the certain dead time of at least one actuator, wherein the control unit (Continued)

outputs time-preceding control signals to the actuator around the dead time.

18 Claims, 4 Drawing Sheets

(51) Int. Cl.
  *B62D 6/00* (2006.01)
  *B62D 15/02* (2006.01)
  *G05D 1/00* (2024.01)
  *G05D 1/02* (2020.01)

(56) References Cited

FOREIGN PATENT DOCUMENTS

| CN | 109562780 A | 4/2019 |
|---|---|---|
| DE | 102014003635 | 7/2015 |
| DE | 102014215243 A1 | 2/2016 |
| DE | 102015223611 A1 | 6/2017 |
| DE | 102016201205 A1 | 7/2017 |
| DE | 102017103132 A1 | 8/2018 |
| EP | 3373095 A1 | 9/2018 |
| JP | 2009280097 A | 12/2009 |

OTHER PUBLICATIONS

German Search Report issued in German Patent Application No. 102019006935.8 dated Aug. 4, 2020. English translation is not available.

International Search Report with English translation and Written Opinion issued in PCT/EP2020/077178 dated Nov. 30, 2020.

Mizutani Naoto et al: "Vehicle speed control by a robotic driver considering time delay and parametric variations", 2016 IEEE 55th Conference on Decision and Control (CDC), IEEE, 12. Dec. 2016 (Dec. 12, 2016), Seiten 2437-2442.

* cited by examiner

200

100

300

400

500

TECHNOLOGY FOR DEAD TIME COMPENSATION DURING TRANSVERSE AND LONGITUDINAL GUIDANCE OF A MOTOR VEHICLE

CROSS-REFERENCE TO RELATED APPLICATIONS

This application is a U.S. National Stage Entry filed under 35 U.S.C. § 371 of International Application No. PCT/EP2020/077178, filed on Sep. 29, 2020, which claims the benefit of, and priority to, German Patent Application No. DE 10 2019 006 935.8, filed on Oct. 4, 2019, the entire content of each of which is incorporated by reference herein.

BACKGROUND

Technical Field

The present disclosure relates to a device and a method for determining and compensating for a dead time of an actuator of a transverse guidance and/or longitudinal vehicle of a motor vehicle such as a utility vehicle.

Background of Related Art

Driver assistance systems (DAS, also "Advanced Driver Assistance Systems" or "ADAS") in the field of heavy utility vehicles often have an automated longitudinal guidance and/or transverse guidance, in which the respective target variable, which can also be referred to as a reference variable, for example, in the form of a desired velocity or a desired distance to a preceding vehicle, or a desired relative deviation to the center of the roadway is ascertained by means of suitable sensors. The regulating strategies used calculate, as a function of the deviation between ascertained target variable and measured actual variable at a given point in time, the positioning components required to regulate in the target variable for the actuators of the vehicle, for example, brakes, engine, and steering. The manipulated variable of the regulation often also consists of a further regulated variable, for example, a target acceleration, for an underlying regulation to activate the actuators.

Conventional systems, for example, a cruise control or an adaptive cruise control, are comfort systems which assist the driver in his driving task but do not relieve him from the responsibility of the driving task. In this respect it is primarily relevant in the case of a cruise control, for example, to regulate the target variable accurately in a stationary manner. The point in time of reaching the target velocity is of subordinate importance in this application. In so-called predictive cruise control systems, for the purpose of increasing efficiency, instead of a statically specified velocity curve, an optimum curve of the target velocity profile with respect to the roadway topography is calculated over the location coordinates of an upcoming route section. A consumption advantage may only be achieved here if the target velocity is also regulated in at the specified location. The accuracy requirements are comparatively low for this purpose due to the low change rates of the topography, however.

With the development of supporting assistance functions toward highly automated driving, input variables for the longitudinal guidance and transverse guidance are conventionally determined by so-called planning algorithms. These calculate, in consideration of the travel destination and the surroundings model calculated from a vehicle-internal onboard sensor system, a trajectory optimized with respect to suitable quality criteria as a reference for the vehicle regulation. This can be understood as a set of upcoming spatially or chronologically discretized points of a state space which can contain, for example, the target acceleration, target velocity associated with the respective location or point in time and position coordinates in the longitudinal direction and transverse direction, and the lane curvature.

Since, in comparison to comfort-oriented driving functions, in highly-automated driving the responsibility for the driving task is passed over to the DAS, in particular in heavy utility vehicles and in spatially constricted driving situations, significantly more restrictive demands result on the spatial and chronological guide behavior of the regulation or the regulation accuracy. Depending on the situation, it can be necessary here to maintain the target position and target orientation of the vehicle along the target trajectory to a few centimeters or significantly less than a degree (1°), for example, when maneuvering a tractor-trailer inside a container terminal. In particular when automatically carrying out lane changes or evasion maneuvers in the presence of other road users, reaching the waypoints of the trajectories at the most exact possible predefined point in time in each case is of decisive significance for safety reasons.

Against the background of significantly more severe accuracy demands, lags and dead times within the actuators are significantly more important in comparison to comfort systems in DAS. Lags and dead times are complex to model due to a variety of technical influences and in addition are dependent on time and state.

If the lag and the dead time of the actuators are not taken into consideration by planning and regulation, a discrepancy thus always occurs between target and actual curves of the trajectories. This can result in undesired driving and planning behavior even in comparatively undemanding situations, for example, frequent resetting of the trajectory planning or instability within the transverse guidance. In document EP 3 373 095 A1, for example, a following regulation ("pure pursuit regulation") in a vehicle group (i.e., a "platoon") having variable prediction and actuator lag compensation by a "lag compensator" (also "lead lag compensator") is described, which increases the phase reserve of the system.

The precision of the vehicle regulation which can be displayed is also dependent on the quality of the dynamic model stored in the planning algorithm, in particular in the field of the transverse dynamics. The variables relevant herein, e.g., tire parameters or moments of inertia, are often time-variable and additionally act with more or less system, are unknown or are only known very roughly, and can only be ascertained with great effort.

SUMMARY

An object of the present disclosure is to provide a device and a method for determining and compensating for the dead time of an actuator of a transverse guidance and/or longitudinal vehicle of a motor vehicle, such as a utility vehicle, which improve the accuracy of the transverse guidance and/or longitudinal guidance. In embodiments, the object is to estimate nonlinearities in the dynamic models of the transverse guidance and/or the longitudinal guidance and/or to take into consideration the dead times of the actuators by estimating nonlinearities in the dynamic models of the transverse guidance and the longitudinal guidance and/or to optimize the planning algorithm of the transverse guidance and/or longitudinal guidance.

This object is achieved by the device and the method and a corresponding motor vehicle having the features of the independent claims. Embodiments of the present disclosure are the subject matter of the dependent claims and are explained in more detail in the following description, partially with reference to the figures.

According to one aspect of the present disclosure, a device is configured to determine and compensate for a dead time of at least one actuator for the transverse guidance or longitudinal guidance of a motor vehicle, such as a utility vehicle. The device includes at least one sensor or at least one sensor interface for acquiring at least one actual value of a movement state of the transverse guidance or the longitudinal guidance. In embodiments, the device may include a determination unit which is designed to determine the dead time of the at least one actuator by comparing at least one target value of the movement state calculated from a dynamic model of the transverse guidance or longitudinal guidance of the motor vehicle to the at least one acquired actual value. In embodiments, the device may include a regulating unit, which is designed to regulate the at least one actuator in dependence on the at least one acquired actual value of the movement state and the determined dead time of the at least one actuator, wherein the regulating unit outputs control signals leading in time by the dead time to the at least one actuator.

The at least one sensor or the at least one sensor interface for acquiring the actual value of the movement state of the motor vehicle can include a steering angle meter, a speed meter, a radar sensor (for example on a front of the motor vehicle), a camera (for example in the optical or infrared spectrum), and/or a lidar sensor (e.g., a sensor for direction-resolved distance measurement or by means of "light detection and ranging", LIDAR) or can be connected thereto for data exchange. In aspects, movement states of a preceding vehicle can be received via radio connection from the preceding vehicle. For example, the distance or the relative velocity to the preceding vehicle can be acquired by the sensors of the motor vehicle and the absolute velocity of the preceding vehicle can be received via the radio connection. In embodiments, the sensor interface can receive data from a navigation satellite system, for example, from a "global positioning system" (GPS).

The movement state can be a regulating variable of the regulating unit. In embodiments, the output control signals can effectuate a change of the movement state by means of the at least one actuator as a function of the at least one acquired actual value of the movement state.

The dynamic model can be a quantitative (e.g., numeric) description of the development over time of the movement state of the transverse guidance or the longitudinal guidance of the motor vehicle. The movement state can be a point in a state space of the dynamic model of the motor vehicle.

The regulating unit can be designed to regulate the at least one actuator using the dynamic model, wherein the dead time may be a parameter of the dynamic model or the movement state may be a dynamic variable (e.g., a variable) of the dynamic model. In embodiments, the dead time of the at least one actuator can be referred to as the actuator dead time.

In aspects, the dynamic model can be referred to as a dynamic model or movement model of the motor vehicle. In embodiments, the actuator can be referred to as an actuator. It is contemplated that the target value can be referred to as a target specification or requested value.

In aspects, the actual value can be referred to as an output variable or measured value.

The target value and the actual value can relate to a corresponding point in time t1. The target value can be determined by evaluation of the dynamic model at the point in time t1, wherein the dynamic model is initialized using an actual value of the movement state acquired at a point in time to. The point in time to can be chronologically before the point in time t1.

The dynamic model can describe a transfer behavior between target value and actual value by means of a transfer function, for example, in the frequency range or by combination of a delay element of first or higher order and a dead time element. The delay element, for example, a PT1 element, of the transfer element can describe a proportional transfer behavior with first-order delay and with an amplification factor K of the actuator. The dead time element can describe a time span between a signal change at the system input and the signal response at the system output. The transfer function of the dynamic model can include a product of the transfer functions of the delay element, for example, an inverse linear function of the time constant of the delay element, and the dead time element, which in embodiments, can be an exponential dependency of the dead time. The dynamic model can include different transfer functions for acceleration processes and braking processes.

At least in one embodiment, the dead time of the actuator can be adapted or taken into consideration in the dynamic model and thus in the regulation by means of the at least one sensor and the determination unit, for example, without installing additional sensors for dedicated measurement of the dead time. In embodiments, the motor vehicle itself, for example without external measurement technology, can determine or correct the dead time during an inspection or during use (e.g., during travel or when it is stopped). In embodiments, the chronologically leading output of the control signals can compensate for the dead time.

In aspects, the device can include a storage unit, which is designed to store the at least one acquired actual value. The at least one sensor or the at least one sensor interface can output the at least one acquired actual value to the storage unit. The determination unit can be designed to read the at least one acquired actual value out of the storage unit or receive it from the storage unit. The determination unit can include a vehicle-internal processing unit. In embodiments, the determination unit can include a vehicle-external processing unit, for example, a central processing unit of a vehicle fleet operator.

According to another aspect, a method for determining and compensating for a dead time of at least one actuator for the transverse guidance or longitudinal guidance of a motor vehicle (e.g., a utility vehicle), includes acquiring at least one actual value of a movement state of the transverse guidance or longitudinal guidance by means of at least one sensor or at least one sensor interface. In aspects, the method may include determining a dead time of the at least one actuator by comparing at least one target value of the movement state calculated from a dynamic model to the at least one acquired actual value. In embodiments, the method may include regulating the dead time of the at least one actuator in dependence on the acquired actual state, wherein a regulation unit of the transverse guidance or longitudinal guidance outputs control signals chronologically leading by the dead time to the actuator.

In aspects, the method may include storing the at least one acquired actual value.

The following features relate to both the device of the first aspect and also the method of the second aspect. Although device features of the first aspect are described hereinafter, they are also considered to be corresponding method steps of the second aspect.

In aspects, the at least one sensor or the at least one sensor interface can include a receiving module for receiving signals of a global navigation satellite system, which in embodiments may include differential correction signals. The global navigation satellite system can include the so-called global positioning system (GPS). The differential correction signals can correspond to the differential GPS (DGPS).

The dynamic model can include a kinematic single-track model. The movement state can include a steering angle of a wheel and an absolute value of the velocity of the motor vehicle.

In the case of rear-axle steering of the motor vehicle, the steering angle can be, for example, the steering angle of the rear wheel.

The kinematic single-track model can include coupled differential equations (for example first-order linear differential equations) for a location coordinate of the longitudinal guidance of the motor vehicle (which is also referred to as the location coordinate in the longitudinal direction), a location coordinate of the transverse guidance of the motor vehicle (which is also referred to as the location coordinate in the transverse direction), or a yaw angle of the motor vehicle. The yaw rate, i.e., the change of the yaw angle, can be a function of the steering angle and in embodiments, the velocity (for example the absolute value of the velocity) of the motor vehicle. A wheelbase of the motor vehicle can be a (for example free) parameter of the dynamic model.

In embodiments, the yaw angle can be dependent on a parameter of the dynamic model, for example, on the wheelbase of the motor vehicle.

In aspects, the dynamic model can include skew rigidities at front and rear axle, center of gravity distances of front and rear axle, a mass of the motor vehicle, or a moment of inertia around a vertical axis of the motor vehicle as parameters. The dynamic model having skew rigidities can include a coupled (for example linear) first-order differential equation system for the change of the location coordinates in the transverse direction of the motor vehicle and the yaw rate.

In embodiments, the determination unit or the regulation unit can be configured to predictively calculate a time series of N future target values of the movement state, and in embodiments, target values of the steering angle or the acceleration, by means of the dynamic model, wherein N is a natural number. The determination unit can determine the dead time of the transverse guidance or the longitudinal guidance on the basis of a chronological position of that target value in the time series which has a minimal deviation from the acquired actual value of the movement state, in particular from the acquired actual value of the steering angle or the acceleration.

In embodiments, the predictive calculation by means of the dynamic model can be referred to as model-predictive calculation or model-predictive calculation. The dead time of the actuator of the transverse guidance can be determined in that in each case the difference of a model-predictive calculated target steering wheel angle and the associated acquired actual steering wheel angle, in embodiments, assigned to the same point in time, is calculated and the minimum of all differences is determined. In aspects, a series of model-predictive calculated target steering wheel angles can be compared to a single acquired actual steering wheel angle. In other aspects, a series of acquired actual steering wheel angles can be compared to a single target steering wheel angle. The dead time of the actuator of the longitudinal guidance can be determined in that in each case the difference of a model-predictive calculated target acceleration and the associated acquired actual acceleration, in embodiments, assigned to the same point in time, is calculated and the minimum of all differences is determined. In embodiments, a series of model-predictive calculated target accelerations can be compared to a single acquired actual acceleration. In aspects, a series of acquired actual accelerations can be compared to a single target acceleration.

Each (for example discrete) index i=1 . . . N of the series can be assigned or correspond to a point in time t1. The series of the future target values indexed with i=1 . . . N at the point in time $t_i$ can be calculated based on an actual value measured at the point in time to as initial value. The points in time can be ordered in increasing sequence, i.e., $t_0 < t_1 < \ldots < t_N$. The comparison of the target value or values to the actual values measured at the point in time $t_i$ can take place directly after the point in time $t_1$. In embodiments, the target value or values and actual value or values can be compared after a final point in time, for example $t_N$. The dead time of the actuator can be determined from the index i of the minimum of the difference from the target value (for example target value of the steering wheel angle) and actual value (for example actual value of the steering wheel angle).

The dead times of the transverse guidance or the longitudinal guidance can be calculated by means of an artificial neural network. The artificial neural network can include a so-called "General Regression Neural Network" (GRNN).

A transfer function of the dynamic model of the transverse guidance or longitudinal guidance can comprise a PT1 element (for example as a factor, in particular in the frequency space). The determination unit can be designed to determine the PT1 element of the transfer function by determining at least one parameter of the PT1 element or from a list of PT1 elements, in that the at least one target value calculated from the dynamic model is compared to the at least one acquired actual value. A list of the dynamic models can include the list of the PT1 elements. The transfer function in the frequency space can include a product of an exponential term, which describes the dead time of the actuator, and polynomial terms in the numerator and denominator of a delay element. A PT1 element can correspond to a linear polynomial in the denominator of a delay element.

The PT1 element can be a linear (e.g., "P" for "proportional") first-order transfer element (e.g., "1" for first-order) in time (e.g., "time" for "T"). The PT1 element can model a relaxation time of the transverse guidance or longitudinal guidance. The list of PT1 elements can correspond to different relaxation times.

The transfer function can model the transverse guidance or longitudinal guidance effectuated by means of the actuator. The transfer function can represent an operational relationship of the transverse guidance or longitudinal guidance effectuated by means of the actuator. In a frequency space representation, the transfer function can be a quotient of the movement state (as an output signal of the transverse guidance or longitudinal guidance effectuated by means of the actuator) and the control signal output to the actuator (as an input signal of the transverse guidance or longitudinal guidance effectuated by means of the actuator).

A transfer function of the dynamic model of the transverse guidance or longitudinal guidance can include a PD1 element (for example as a factor, in particular in the frequency space). In embodiments, the determination unit or the regulation unit can be designed to determine or compensate for the lag of the actuator. The lag of the actuator can be compensated for by a polynomial in the numerator of the delay element of the transfer function in the frequency space. The PD1 element can comprise a linear (e.g., "P" for "proportional") regulator having a differentiating (e.g., "D" for "differential") first-order component.

The transverse guidance or the longitudinal guidance can include a following regulation for a vehicle in a vehicle group. In aspects, a vehicle group can be referred to as a platoon. The following regulation can include a so-called pure pursuit regulation having variable prediction and actuator lag compensation. The variable prediction can include a (for example linear) dependence of a target steering angle of a following vehicle on a (in embodiments, offset by a time constant) actual steering angle of the preceding vehicle in the vehicle group. In embodiments, the actuator lag compensation can be referred to as lag compensation or lead lag compensation. In aspects, the lag compensation can include a dominant pole compensation, which is incorporated as an additional transfer element in the transfer function of the actuator. The time constant of the lag compensation element can be different from the time constant of the other transfer function elements. In embodiments, the time constant of the lag compensation element can be less than the time constant of a PT1 element or a higher-order polynomial element.

The determination unit or the regulation unit can be designed to change model parameters of the dynamic model during the driving operation and/or to comprise at least one interface to change model parameters of the dynamic model during the driving operation. The time specification "during the driving operation" can also be implemented herein as "at the runtime". Model parameters of the dynamic model can include skew rigidities at front and rear axle, center of gravity distances of front and rear axle, a mass of the motor vehicle, moments of inertia (for example around a vertical axis of the motor vehicle), tire parameters, a rolling resistance, lags of actuators, or dead times of actuators.

An estimation of parameters of the dynamic model can be adapted in dependence on a recognized driving operating state. The driving operating state can include a driving maneuver. The driving operating state can include a travel at constant velocity, an acceleration, a braking process, or a lane change process.

An initialization (for example of an estimated value) of a model parameter of the dynamic model can be carried out using measured or empirically determined starting values or initial values determined outside the driving operation or by offline fitting and/or can be limited to a physically reasonable value range. "Offline" is understood as calculation outside the running driving operation. In embodiments, a calculation can be carried out by means of an artificial neural network, for example a "General Regression Neural Network" (GRNN). A calculation during the running driving operation may be referred to as online calculation. In embodiments, an online calculation can include a radio connection of the motor vehicle to an external calculation unit, for example a computer system of the vehicle fleet operator. The online calculation can take place internally in the vehicle or externally to the vehicle.

In aspects, the virtual wheelbase of the kinematic single-track model can be estimated.

A virtual wheelbase can include an estimation of the actual wheelbase of the vehicle. In embodiments, the virtual wheelbase can take into consideration further effects, for example, the skew rigidities.

In embodiments, at least one of the parameters from the set of a transverse acceleration, a steering wheel angle, a yaw rate, and a curvature of the trajectory of the motor vehicle can span an input space of an artificial neural network, and in embodiments, for estimating the virtual wheelbase. The estimated value of the virtual wheelbase can be fed into the dynamic model of the determination unit or the regulating unit.

According to a further aspect, a motor vehicle, and in embodiments, a utility vehicle, includes a device according to the above aspect for determining and compensating for a dead time of at least one actuator for the transverse guidance and/or longitudinal guidance. In embodiments, a motor vehicle may be designed to carry out the method according to the above second aspect for determining and compensating for a dead time.

In each aspect, the utility vehicle can be a truck, a tractor, a bus, or a mobile crane.

Above-described features are implementable in any combination.

BRIEF DESCRIPTION OF THE DRAWINGS

Various aspects of the features of the present disclosure invention are described hereinafter with reference to the appended drawings, in which.

DETAILED DESCRIPTION

Figure 1:
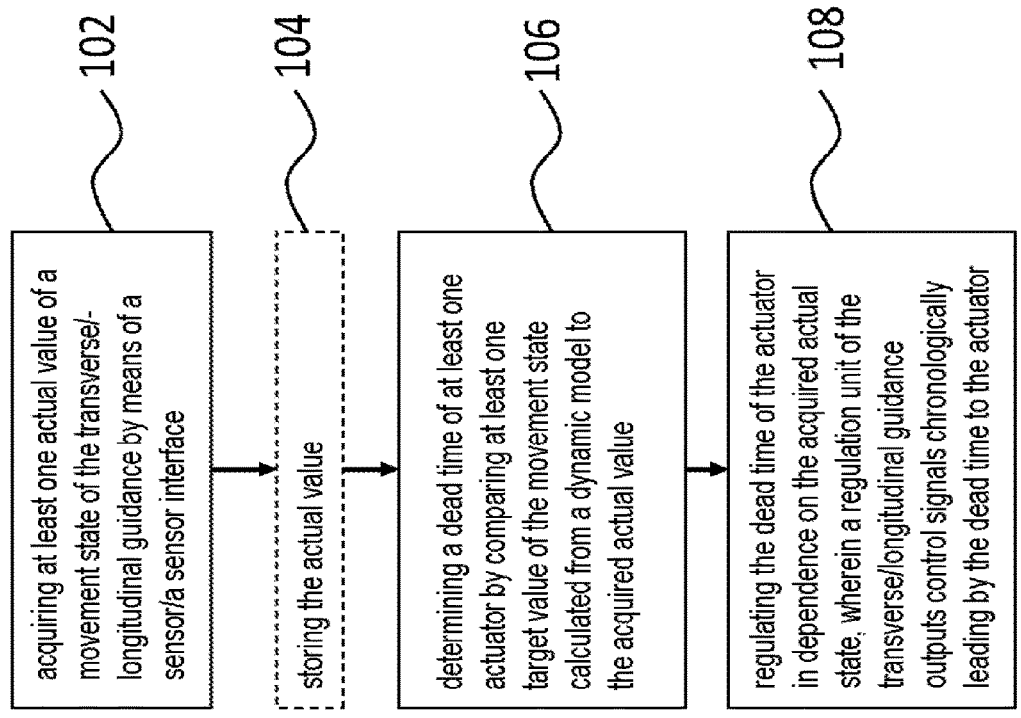
FIG. 1 shows an embodiment of a method for determining and compensating for a dead time of an actuator.

FIG. 1 shows an embodiment of a method provided in accordance with the present disclosure, identified in general by reference sign 100, for determining and compensating for the dead time of an actuator of the transverse guidance or the longitudinal guidance of a motor vehicle, and in embodiments, a utility vehicle. In a first step 102 of the method 100, one or more actual values of the movement state of the transverse guidance or the longitudinal guidance of the vehicle are acquired by means of a sensor or a sensor interface. In an optional step 104, the actual value or the actual values can be stored. In a further step 106, the dead time of the actuator is determined by comparing the actual value or the actual values to target value(s) calculated from a dynamic model. In step 108, the dead time of the actuator is regulated in that the transverse guidance or the longitudinal guidance sends control signals chronologically leading by the dead time to the actuator.

Figure 2:
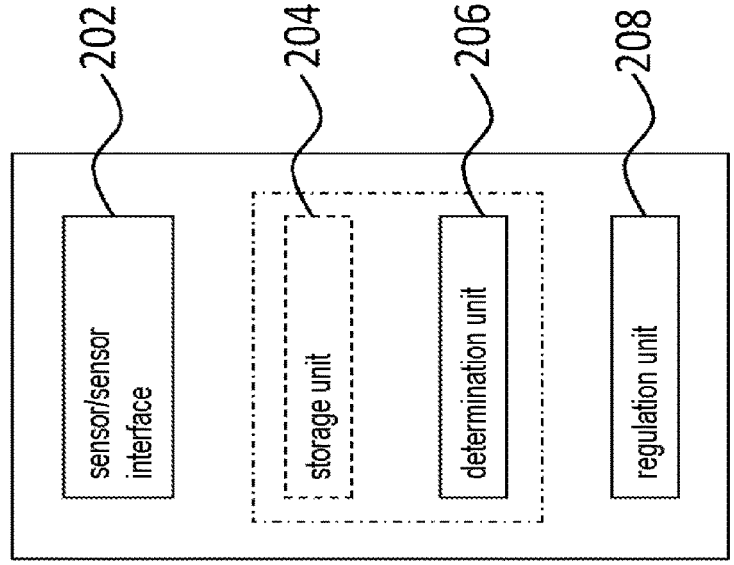
FIG. 2 shows an embodiment of a device designed to carry out the method according to FIG. 1.

FIG. 2 shows an embodiment of a device provided in accordance with the present disclosure, identified in general by reference sign 200, for determining and compensating for the dead time of an actuator of a motor vehicle on the basis of the example of a utility vehicle. The device 200 includes a sensor 202 or a sensor interface, which is designed to carry out step 102 of acquiring actual value(s) of the movement state. In embodiments, the device 200 may include a storage unit 204, which is designed to carry out step 104 of storing the actual value(s). The device 200 includes a determination unit 206, which is designed to execute step 106 of determining the dead time of the actuator on the basis of a comparison of ascertained target values and measured actual values. The regulation unit 208 of the device 200 is designed to execute step 108 of the regulation of the dead time of the actuator by a chronologically leading output of the control signals. All units 204, 206, 208 and sensors 202 or sensor interfaces can be internal to the vehicle. In embodiments, the storage unit 204 or the determination unit 206 can be external to the vehicle. For example, the one or more acquired actual value(s) of the movement state can be sent during the driving operation via a radio connection to the operator of the vehicle fleet, to which the utility vehicle belongs. A central, and in embodiments, vehicle-external, determination unit 206 can determine the dead time on the basis of the received actual values and send it to the utility vehicle during the driving operation via the or a further radio connection. In embodiments, the one or more actual values can be stored during the driving operation on a vehicle-internal storage unit 204. The data of the storage unit 204 can be read out by a vehicle-external determination unit 206 outside the driving operation, for example, during maintenance or when parking on the vehicle fleet of the fleet company. The vehicle-external determination unit 206 can determine the dead time on the basis of the read-out data, in embodiments past actual values of the movement state, and transmit it to the vehicle-internal regulation unit 208 of the utility vehicle.

In conventional methods for at least partially automated operation of vehicles, a future target driving state matching with the given driving task is determined by means of a movement planning algorithm based on a surroundings model, generated, inter alia, by means of surroundings sensors and high-accuracy digital map data, this target driving state being transferred as a target value to a vehicle longitudinal guidance and vehicle transverse guidance (also referred to hereinafter as following regulation). The target driving state $x_{soll,t}$ determined by the movement planning can contain here the target values associated with a fixed point in time t or location, in embodiments in the longitudinal direction and transverse direction of the vehicle, for location coordinates (x,y), velocities ($v_x$, $v_y$), acceleration ($\alpha_x$, $\alpha_y$) along various coordinate axes, and/or yaw angle $\psi$ and yaw rate (change over time of the yaw angle $\psi$)):

$$x_{soll,t} = \{t, x, y, v_x, v_y, \alpha_x, \alpha_y, \dot{\psi}, \ldots\}.$$

A set of N spatially or chronologically discretized target driving states, usually within a certain chronological and/or positional predictive horizon, is referred to here as the target trajectory $X_{soll}$:

$$X_{soll} = \{x_{soll,t0}, x_{soll,t1}, \ldots, x_{soll,tN}\}.$$

The target driving states here are chronologically ordered from a starting point in time to on ($t_0 < t_1 < \ldots < t_N$). Conventional methods for movement planning use greatly simplified movement models here due to limited processing power, in order to calculate different sets of vehicle states within a given predictive horizon, which result in the selected driving destination. In an optimization step, in consideration of vehicle-specific boundary conditions, for example the mass of the vehicle and/or a loading state and/or an acceleration capability, the target trajectory optimal with respect to suitable quality criteria is identified and transferred to the following regulation.

Actuators, in embodiments, vehicle actuators, can refer to a plurality of the actuators of the motor vehicle here.

The object of the following regulation is subsequently to calculate suitable specifications for the vehicle actuators (engine, transmission, brakes, steering) in order to equalize the actual state $x_{ist,t}$ of the vehicle to the target state along the trajectory $X_{soll}$. Some conventional regulating strategies take the (in embodiments target) trajectory of a reference state $x_{soll,tk}$, wherein the chronological prediction can be selected as a function of travel velocity and positioning dynamics. k is in this case a fixedly selected index of a point on a target trajectory $X_{soll}$. Other conventional regulating strategies use, in model-predictive methods, multiple (in embodiments target) states or the entire (in embodiments target) trajectory to implement a driving profile which is optimal with respect to positioning effort and following behavior. Both methods therefore use implicit or explicit knowledge about the dynamics of the automated vehicle.

If the dynamic models conventionally used for the movement planning inadequately depict the vehicle, the probability increases that the vehicle guided by the following regulation cannot follow the (target) trajectory with the required accuracy. The probability also increases that the vehicle guided by the following regulation can no longer follow the (target) trajectory with the required accuracy when the explicitly or implicitly modeled dynamics of the vehicle used in the regulation deviate strongly from the real vehicle behavior. The regulation accuracy with which the automated vehicle follows the (target) trajectory specified by the planning is dependent on how precise the models of the vehicle dynamics used in planning and regulation describe the real vehicle behavior.

As a result of the limited available processing power, in particular internally in the vehicle, it is only of limited utility to increase the accuracy of the dynamic models by a strong increase of the model depth or model order. Many parameters influencing the dynamics, such as tire skew rigidities or straight-ahead running behavior, are only measurable with difficulty and/or change over time, so that the approach of metrologically acquiring as many physical parameters as possible and taking them into consideration in the model is limited in the result, in particular in the case of a continuous adaptation during the driving operation.

Exemplary embodiments of the device enable, by way of suitable calculation methods, dominant (for example nonlinear) dynamic components, which are not depicted by simple movement models, to be ascertained at the runtime within suitable driving situations. The ascertained dynamic components are converted into a few model parameters, which are not necessarily physically motivated, and transferred to the planning regulation algorithm and/or the following regulation algorithm of the vehicle. Due to the adaptation of the movement planning and following regulation as a function of the estimated dynamic components, an increase of the accuracy, with which the vehicle automatically follows a given trajectory, is achieved in the interaction of both components (movement planning and following regulation).

The device and the method for determining and compensating for a dead time of an actuator may include the storage of past values of target driving states (along the target trajectories) and of actual driving states, which are acquired by suitable sensors in and/or on the vehicle.

In one non-limiting embodiment, the method 100 may have a sensor system, for example, a high-accuracy DGPS-supported inertial measuring sensor system, for precise determination of the position and the movement state of the vehicle. The vehicle can also be referred to as an ego vehicle. In embodiments, the method 100 may have a self-locating function using GPS, intrinsic movement data of the vehicle-internal sensor system, and the surroundings model.

One component of the method 100 may include the modeling of dead times and/or lags of the longitudinal-dynamic and/or transverse-dynamic actuators within the planning and/or regulation. The transfer behavior between target specification and output variable of the actuator can be described in simplified form using a transfer function, which is widespread in system theory and regulation technology, in the frequency range according to equation (1) by combination, in embodiments, a product, of a first (or higher) order delay element, for example a PT1 element, and a dead time element:

$$G_A(s) = \frac{Y_A(s)}{U_A(s)} = \frac{K_A}{T_A s + 1} \cdot e^{-T_T s}. \quad (1)$$

Therein, $K_A$ is the stationary amplification and $T_A$ is the time constant of the delay element, $T_T$ is the dead time, and s is the independent complex variable in the frequency range. In one advantageous embodiment of the method 100, different transfer functions are used for acceleration processes and braking processes.

In embodiments, the method 100 may include modeling of the transverse dynamics of the vehicle within the planning and the regulation. According to one non-limiting embodiment of the method 100, the kinematic single-track model according to equation (2) is used as the dynamic model. Therein, $\delta_{wheel}$ is the steering angle of the wheel of the modeled single-track vehicle, v is the absolute value of the velocity, and l is the wheelbase, which depicts the dynamics of the vehicle as a free parameter. x, y, $\psi$ are respectively the longitudinal coordinate, the transverse coordinate, and the yaw angle:

$$\dot{\psi} = \frac{v}{l} \cdot \tan(\delta_{wheel}), \; \dot{x} = v \cdot \cos(\psi), \; \dot{y} = v \cdot \sin(\psi). \quad (2)$$

According to another embodiment of the present disclosure, which is combinable with the preceding exemplary embodiment, the dynamic model according to equation (3) is used. Therein, $c_v$ and $c_h$ (the skew rigidities at front and rear axle), $l_v$ and $l_h$ (the center of gravity distances of front and rear axle), m (the mass of the vehicle), and $J_z$ (the moment of inertia around the vertical axis) are the free parameters for describing the dynamics of the vehicle, and $\delta_{LRW}$ is the steering wheel angle. In comparison to the embodiment according to equation (2), this embodiment can also describe the transverse movement of the vehicle in the dynamic range with non-vanishing skew angles:

$$\begin{bmatrix} \ddot{y} \\ \ddot{\psi} \end{bmatrix} = \begin{bmatrix} -\frac{c_v + c_h}{mv} & -\frac{c_v l_v - c_h l_h}{mv} + v \\ \frac{c_v l_v - c_h l_h}{J_z v} & -\frac{c_v l_v^2 - c_h l_h^2}{J_z v} \end{bmatrix} \begin{bmatrix} \dot{y} \\ \dot{\psi} \end{bmatrix} + \begin{bmatrix} \frac{c_v}{m} \\ \frac{c_v l_v}{J_z} \end{bmatrix} \delta_{LRW}. \quad (3)$$

In embodiments, the method 100 may have a model-predictive transverse regulation, which outputs a series N of future steering wheel angles $\delta_{LRW,soll}$, in order to stabilize the vehicle along a trajectory:

$$\delta_{LRW,soll} = [\delta_1, \delta_2, \ldots \delta_N]^T.$$

In embodiments, the method 100 may implement the longitudinal regulation and/or transverse regulation by means of a pure pursuit regulation having variable prediction and actuator lag compensation. Its delay element, optionally having a dominant pole compensation by a so-called lag compensator (also "lead lag compensator"), is already known from document EP 3 373 095 A1, but without taking into consideration a dead time in the transfer function.

The method 100 has, for example, various functions for estimating longitudinal dynamic parameters and/or transverse dynamic parameters for the dynamic model used utilizing the current and the stored past values of the target trajectories and the actual trajectories at the runtime. If the estimation in method 100 is bound to certain driving situations or driving maneuvers—for example as a result of the observability criteria for states or parameters known from system theory—the method has functions or properties which recognize the required driving maneuvers and control the execution of the estimation method, for example, in the form of state machines.

According to another embodiment of the present disclosure, which is combinable with any other embodiment, the dynamic-model-dependent components used in planning and regulation have suitable interfaces for changing model parameters during the driving operation (e.g., at the runtime). The change of the model parameters is automatically prompted here.

According to another embodiment, the method 100 may have an initialization of the estimated values of the respective parameters using initial values determined empirically and/or by offline fitting (adaptation outside the driving operation). Furthermore, the method may include limiting the estimated values to physically reasonable value ranges (dead times in the second range, mass of the vehicle which does not deviate too much from production characteristic numbers, . . . ). Driving maneuvers are recognized during the runtime and parameters are adapted, for example continuously.

To determine dynamic parameters, the determination unit 206 preferably uses the stored past values of target specifications and implemented actual variables. In one non-limiting embodiment of the method 100, the results are calculated directly at the runtime. A further embodiment of the method 100 carries out the calculation using recordings of suitable measuring journeys offline, for example, during maintenance or at a standstill in the vehicle fleet. The results can be determined, for example, in the form of characteristic maps or by artificial neural networks (networks) trained offline at the runtime to ascertain the respective estimated variable.

In embodiments, artificial neural networks are used to determine actuator dead times on the basis of the deviation between target specification and implementation of the request, for example, an acceleration or an engine torque or brake pressure. In embodiments, individual past values of one or more positioning or state variables or sequences of multiple past values can be used.

Figure 3:
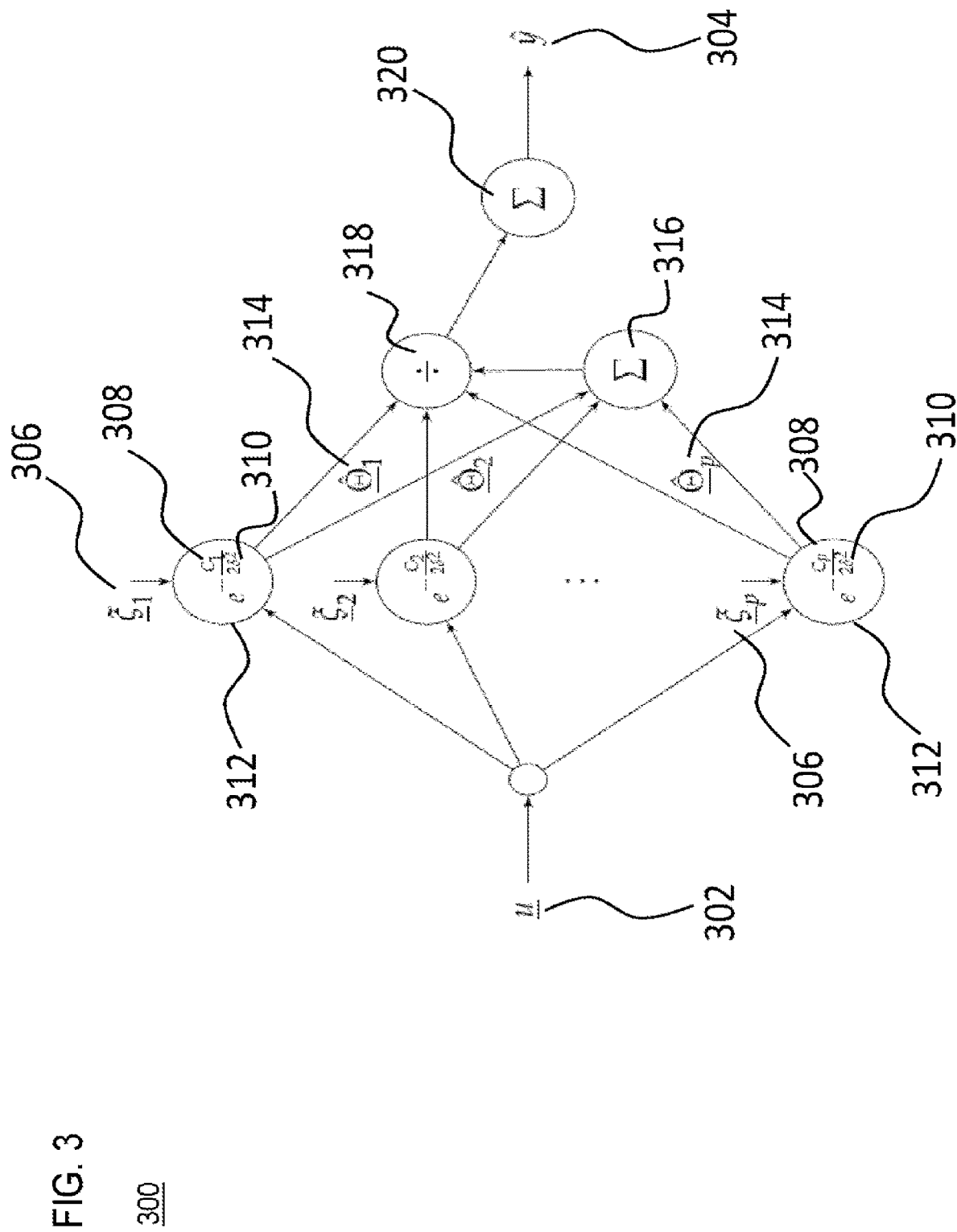
FIG. 3 shows a schematic artificial neural network.

FIG. 3 shows an artificial neural network 300 provided in accordance with the present disclosure, which is designed as a so-called "General Regression Neural Network" (GRNN), which belongs to the class of radial base neural networks, and comprises a layer of p neurons.

The GRNN 300 furthermore comprises input values u 302 arranged in an N-dimensional vector and an output variable $\hat{y}(\underline{u})$ 304. The GRNN 300 uses Gaussian curves, which belong to the class of radial base functions (RBFs), as activation functions $A_i$ 312 with centers of gravity of the base functions or activation parameters $\tilde{\varsigma}_i$ 306, wherein i=1 . . . p indexes the neurons. The input space $\underline{u} \in R^N$ is divided uniformly in accordance with the number of neurons. The square of the Euclidean distance $C_i$ 308 between input variable $u_k$ 302 with k=1, . . . , N and the center of gravity of the radial base function $\widetilde{\varsigma_{i,k}}$ 306 is calculated from $C_i = \Sigma_{k=1}^{N}(u_k - \widetilde{\varsigma_{i,k}})^2$. The input variables 302 can also be referred to as a "training sample" or "input". Output variable 304 can also be referred to as an "output".

The standard deviation $\delta$ 310 defines the width of the activation functions $A_i$ 312. In a conventional radial base network, the activation functions 312 are defined as $$A_i = \exp\left(-\frac{c_i}{2\delta^2}\right).$$

A GRNN 300 is distinguished in that the activation functions are normed, $$A_i = \frac{\exp\left(-\frac{c_i}{2\delta^2}\right)}{\sum_{j=1}^{p} \exp\left(-\frac{c_j}{2\delta^2}\right)}.$$

Accordingly, a neuron having activation function $A_i$ 312 is activated more strongly the closer the input value $u_k$ 302 is located to the respective support value or activation parameter 306 of the RBF. The output of the network is determined by a sum of all activations weighted using the parameters $\hat{\underline{\Theta}}_i$ 314.

The GRNN 300 can first in one step form the weighted sum 316 of the non-normed activation functions, $$A_i = \exp\left(-\frac{c_i}{2\delta^2}\right),$$

312 and in a following step 318 divide it by the shared norming factor, to obtain the sum 320 of the normed activation functions. Alternatively, the activation functions 312 can first be normed in step 318, $$A_i = \frac{\exp\left(-\frac{c_i}{2\delta^2}\right)}{\sum_{j=1}^{p} \exp\left(-\frac{c_j}{2\delta^2}\right)},$$

and in following step 320, the sum of the normed activation functions can be formed.

The calculation of the output variable 304 by the neural network 300 can take place offline or online. Online primarily means here that the method is carried out during the journey. In addition, the vehicle can be continuously in radio contact during the journey with an external processing unit, for example a supercomputer, and the calculation can take place outside the vehicle.

If the activation functions 312 of all neural networks are combined to form a vector A and the weights 314 are combined to form a vector $\hat{\underline{\Theta}}$, the following rule results for determining the error e between predicted and measured estimated value:

$$e(\underline{u}) = \underline{y}(\underline{u}) - \hat{y}(\underline{u}) = \hat{\underline{\Theta}}^T \underline{A}(\underline{u}) - \underline{\Theta}^T \underline{A}(\underline{u}),$$

wherein $\Theta$ is the vector of the ideal weights, $\hat{\Theta}$ is the vector of the adapted weights 314 on the basis of training data, $\hat{y}(\underline{u})$ is the output variable 304 calculated by the neural network, for example the GRNN 300, and $y(\underline{u})$ is the actual output variable of the system.

The training of the network takes place at the runtime, for example during the driving operation, by means of an adaptation method, in which the values $\hat{\Theta}_i$ 314 at the runtime are changed by means of stored target values and stored actual values for states and/or positioning variables so that the error $e(\underline{u})$ is minimized.

A conventional iterative gradient descent method having a so-called "momentum term" $\Delta\hat{\Theta}[l]$, i.e., the differential amount for optimization in the l-th iteration step, is used here:

$$\hat{\underline{\Theta}}[l+1] = \hat{\underline{\Theta}}[l] + \Delta\hat{\underline{\Theta}}[l].$$

The "momentum term" can be determined, for example, from the product of error and vector of the activation functions using an iteration step width factor 71 and a parameter $0 \leq \alpha < 1$ and the "momentum term" $\Delta\hat{\Theta}[l-1]$ of the preceding, (l–1)-th, iteration step:

$$\Delta\hat{\underline{\Theta}} = -\eta e(\underline{u})[l]\underline{A}(\underline{u})[l] + \alpha \Delta\hat{\underline{\Theta}}[l-1].$$

An embodiment of the determination of the dead time of the transverse dynamics of a utility vehicle is described hereinafter. The dead time within the transverse dynamics is understood as the time span $T_{T,\delta}$ (which can also be designated with $T_T$ or $\tau_\delta$) which passes between the point in time of the request for a steering angle and its actuator-side implementation.

Figure 4:
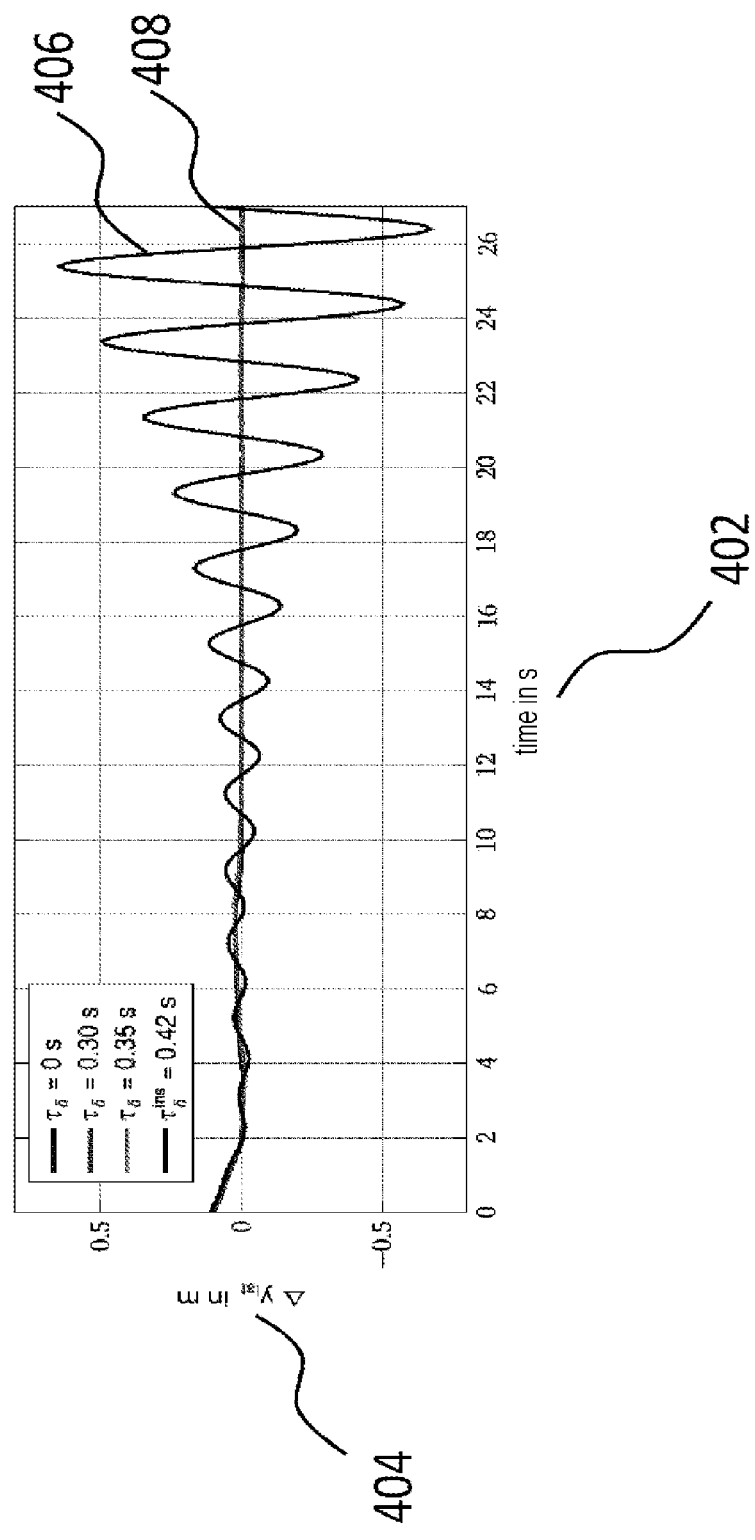
FIG. 4 shows an embodiment of an instability in the transverse guidance as a function of the dead time.

FIG. 4 schematically shows a relationship 400 between the time curve 402 and the deviation of the transverse coordinate 404 or a steering angle from a target trajectory. The strongly oscillating curve 406 corresponds to a large dead time of 0.42 s. The flat curve 408 corresponds to a shorter dead time of 0.35 s. Dead times which are shorter than 0.35 s only deviate slightly in the first two seconds from the flat curve of a dead time of 0.35 s. A regulated system tends toward instability with increasing dead time.

To estimate the dead time occurring in the system, up to a point in time $T_d$ which can be parameterized, past values of the requested steering angle $\delta_{soll,k}$ and the actually implemented steering angle $\delta_{ist,k}$ are stored:

$$\delta_{soll} = [\delta_{soll,1}, \delta_{soll,2}, \ldots, \delta_{soll,T_d}]^T, \delta_{ist} = [\delta_{ist,1}, \delta_{ist,2}, \ldots, \delta_{ist,T_d}]^T$$

Therein, $T_d$ defines the maximum value of the estimated value for the dead time $T_{T,\delta}$.

In one non-limiting embodiment of the method, a preprocessing step is introduced, in which for the requested manipulated variable $\delta_{soll,T_d}$, the manipulated variable within $\delta_{ist}$ having the smallest difference to $\delta_{soll,T_d}$ is determined:

$$\Delta\delta_{min} = \min|(\delta_{ist} - \delta_{soll,T_d})| \text{ or } \Delta\delta_{min} = \min_k|\delta_{ist,k} - \delta_{soll,T_d}|.$$

With $\Delta\delta_{min}$, the associated index k in $\delta_{ist}$ is also provided, whereby a value $T_{T,\delta}$ for the present dead time may be determined on the basis of the timestamp (associated with the index k). This dead time determined in this way is stored in the GRNN. The input space of the GRNN has the dimension 2 and is spanned by the requested steering angle (or steering wheel angle) $\delta_{soll,T_d}$ and the requested steering angle change rate (or steering wheel angle change rate) $\dot{\delta}_{soll,T_d}$. Each dimension of the input space is divided within a predefined operating range into respectively p (for example p=21) support points, whereby the GRNN has a total of $p^2$, (for example $p^2$=441) neurons.

The release function for the estimation excludes the operation at excessively low velocities, in the event of irregularities in the steering profile, and in the case of excessively high steering angles and steering angle change rates and also as a function of the sign change in $(\delta_{ist}-\delta_{soll,T_d})$.

Another embodiment of the method uses the GRNN structure to estimate the time constant of an actuator function defined as a PT1 element. The target value signal vector is applied to a database having differently modeled PT1 elements. The stored PT1 function having the smallest deviation from the measured actual curve then specifies the estimated value of the time constant.

In embodiments, the method uses sequences of recorded past values which are longer than the estimated dead time, $T_d \gg T_{T,\delta}$, wherein the input vectors are divided in a preprocessing step into ranges in which the parameters contained in the transfer function are observable particularly well. The range of a shift process is unsuitable, for example, since the dead time rises into infinity during the shift process. Subsequently, the examined overall range and the partial ranges associated with individual parameters are divided into discrete support points.

Each one of these networks assigned to sampling vectors or input vectors, for example GRNNs, can either be trained online, in that—as described for dead time and PT1 time constant—reference models are used, or in embodiments, they are trained offline by means of more complex reference models and carrying out certain reference maneuvers, such as jump specification of target steering angles, and stored in the model. The processing time can increase offline in this way. The processing time online is shortened.

In one non-limiting embodiment, the regulation has a pure pursuit regulator, which determines, along a given reference trajectory $X_{soll}=[x_{soll}, y_{soll}, \ldots]^T$ as a function of the velocity, a defined target prediction $\Delta x$ (difference of current position on the actual trajectory and point of the prediction or reference trajectory), which is in turn converted into a target curvature and a target yaw rate, by which the vehicle reaches the desired (target) value $y_v$ (for example of the transverse coordinate) at a (in particular specified) point $x_v$ (for example of the longitudinal coordinate). In embodiments, the vehicle-intrinsic longitudinal coordinate 502 and the vehicle-intrinsic transverse coordinate 504 are designated in FIG. 5 by $x_{soll}, y_{soll}$. The dead time of the actuator can be taken into consideration and/or compensated for in that the following approach is selected for the prediction:

$$x_v = v \cdot (t_v + T_{T,\delta}).$$

$t_v$ denotes the point in time at which the (in embodiments specified) point $x_v$ of the longitudinal coordinate (of the rear axle) is reached at a (in embodiments longitudinal) velocity v of the vehicle.

According to another embodiment of the present disclosure, which is combinable with any other embodiment, the method 100 may have a compensation transfer function of the following form, the transmission zero point $T_{A,\delta}$, of which compensates for the transfer pole of the actuator transfer function, $G_A(s)$:

$$G_K(s) = \frac{\delta_{R,k}(s)}{\delta_R(s)} = \frac{T_k s + 1}{(T_{A,\delta} s + 1)^2}$$

For example, the lag of the actuators of the transverse guidance can be taken into consideration in the dynamic model by the compensation transfer function. The compensation transfer function can also be referred to as lag compensation or as lead lag compensation In embodiments, the compensation of the dead time, for example in a pure pursuit regulation, and the introduction of a compensation transfer function are combined.

According to another aspect of the present disclosure, the regulation, in embodiments the transverse guidance, is implemented by means of a model-predictive approach and specifies target steering angles $\delta_{soll}=[\delta_{soll,1}, \ldots \delta_{soll,p}]$ for the respective following p time steps. If now, in accordance with the estimated dead time, a corresponding chronologically leading steering angle $\delta_{TT\delta}$ with $t_{TT\delta}=T_{T,\delta}$ is transferred to the actuators (e.g., the dead time determines the point in time of the specification), the steering requirements $[\delta_1, \ldots \delta_{TT\delta-1}]$ thus remain unconsidered. However, since in the model-predictive approach, these often contain the primary positioning expenditure for transferring the vehicle to the target trajectory, this approach would be linked to significant losses in the convergence behavior of the regulation. A correspondingly better approach is to expand the model-predictive (in embodiments transverse) regulator in such a way that in accordance with the estimated dead time, the manipulated variables $[\delta_1, \ldots \delta_{TT\delta-1}]$ not yet implemented by the actuator are stored. The storage space required for this purpose is minimal. Before the regulator is called up in the next time step, the vehicle state used by the regulator, in embodiments the locating by means of model-supported forward integration, is corrected.

Figure 5:
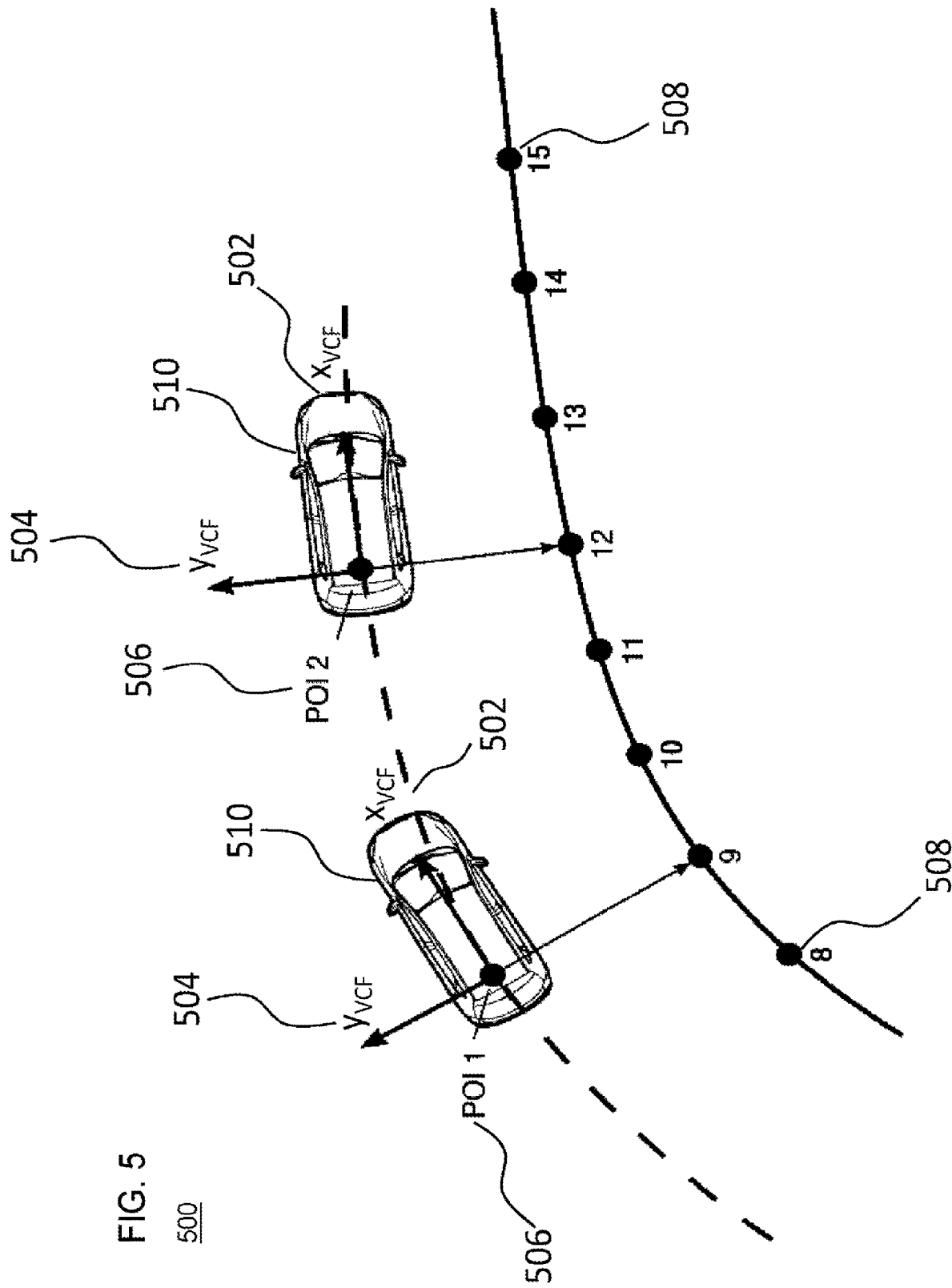
FIG. 5 shows an embodiment of a compensation for the dead time in model-predictive regulation.

FIG. 5 shows an embodiment of a model-predictive regulation 500. A vehicle 510 having vehicle-intrinsic longitudinal coordinate 502 and vehicle-intrinsic transverse coordinate 504 ("Vehicle Coordinate System Fixed" or "VCF") is shown at two points 506 ("Point of Interest" or "POI"). For example, the spatial position of the "POI 1" is reached at an earlier point in time than the spatial position of the "POI 2". The origin of the vehicle-intrinsic coordinate system is located in the center on the rear axle of the vehicle. The index 9 on a reference trajectory or target trajectory 508 is assigned to the "POI 1". The index 12 on the reference trajectory or target trajectory 508 is assigned to the "POI 2". The model-predictive regulation 500 can calculate, for example, the target value associated with the "POI 2" by forward integration from the time step at which the "POI 1" is reached.

In one non-limiting embodiment, which is combinable with all other embodiments, the "virtual" wheelbase of the kinematic single-track model can be estimated by means of an artificial neural network, in embodiments the GRNN 300. The wheelbase is referred to as "virtual", since in addition to effects of the variation of the actual wheelbase, further effects not otherwise considered, such as skew rigidities, are also taken into consideration in its estimation. Similarly to the method for determining the dead time of the transverse guidance and/or the longitudinal guidance, past values of relevant variables are analyzed. The relevant variables for estimating the "virtual" wheelbase comprise vectors of the transverse acceleration $\alpha_y$ and of the actual steering wheel angle $\delta_{LRW,ist}$. In a subsequent processing step, on the basis of the differential equations (2) of the kinematic single-track model, an estimated value of the "virtual" wheelbase l is ascertained, which is fed into the GRNN 300.

According to one non-limiting embodiment, the transverse acceleration and the steering wheel angle represent the two dimensions of the input space, for example of the GRNN 300, and are each discretized into p (for example p=21) support points, preferably within reasonable value ranges. At the runtime, the weights of the resulting $p^2$ (for example $p^2=441$) neurons are adapted to minimize the error between measurement and prediction.

In embodiments, a network structure having one-dimensional input space, in embodiments the absolute value of the transverse acceleration, is selected. This is divided within a reasonable value range, for example an acceleration of 0 m/s$^2$ to 3 m/s$^2$, into p (for example p=21) support points. The weights are adapted at the runtime to minimize the error between precalculated or predicted and measured lateral position errors.

A partial function of the method ensures that only those data are used for training the networks which were acquired in driving situations, within which according to suitable system-theoretical criteria, observability of the wheelbase is provided with respect to the transverse acceleration. Furthermore, the estimated wheelbase is limited to suitable minimal and maximal values.

In embodiments, the method 100 may take into consideration further state variables in addition to the transverse acceleration and the steering angle, for example, the yaw rate and/or curvature, for example of the trajectory of the vehicle.

In one non-limiting embodiment, the method for determining the virtual wheelbase may include the use of longer sequences of recorded past values. The examined value range is divided into discrete support points. A sampling vector or input vector is assigned to each discrete support point. The network assigned to the input vector can be trained online in that differently parameterized reference models, for example, characterized by the differential equations (2) of the kinematic single-track model, are used. In embodiments, the method for determining the virtual wheelbase can be trained offline by means of more complex reference models than the kinematic single-track model and while carrying out predetermined reference maneuvers, for example a jump specification of target steering angles, and stored in the dynamic model.

According to one non-limiting embodiment of the method, in which a model-predictive transverse regulation is used, the estimated value of the virtual wheelbase is fed directly into its dynamic model.

Additional embodiments of determining and compensating for the dead time of the longitudinal dynamics are described hereinafter. The time span $T_{T,a}$ (dead time of the actuators), which passes between the point in time of the request for a target acceleration and its actuator-side implementation can be understood here as the dead time within the longitudinal dynamics.

To estimate the dead time occurring in the system, up to a point in time $T_d$ which can be parameterized, past values of the requested target acceleration, which can also be referred to as the requested manipulated variable, and the actually implemented actual acceleration, which can also be referred to as the implemented manipulated variable, are stored:

$$\alpha_{soll}=[\alpha_{soll,1}, \ldots \alpha_{soll,T_d}]^T, \alpha_{ist}=[\iota_{ist,1}, \ldots, \alpha_{ist,T_d}]^T.$$

$T_d$ denotes the maximum value of the estimated value for the dead time $T_{T,a}$.

According to one non-limiting embodiment of the method for determining and compensating for the dead time of the longitudinal guidance, a preprocessing step is introduced, in which for the requested manipulated variable $\alpha_{soll}$, $T_d$, the manipulated variable within $a_{ist}$ having the least difference to $\alpha_{soll,T_d}$ is determined:

$$\Delta\alpha_{min}=\min|(\alpha_{ist}-\alpha_{soll,T_d})| \quad \text{or} \quad \Delta\alpha_{min}=\min_k|\alpha_{ist,k}-\alpha_{soll,T_d}|.$$

k=1 . . . $T_d$ denotes the index within the series of actual accelerations and/or target accelerations here.

With $\Delta\alpha_{min}$, the associated index k is provided in $a_{ist}$, whereby on the basis of the timestamp for the index k, a value $T_{T,a}$ for the dead time of the longitudinal guidance may be determined. This dead time of the longitudinal guidance thus determined is stored in the GRNN. The input space of the GRNN has the dimension N=2 and is spanned by the requested target acceleration $\alpha_{soll,T_d}$ and the velocity v. Each dimension of the input space is divided within a predefined operating range into respectively p (for example p=21) support points, whereby the GRNN has a total of p$^2$ (for example p$^2$=441) neurons.

According to one non-limiting embodiment of the determination and compensation of the dead time of the longitudinal guidance, the dead times for different operating states, in embodiments an engine operation and a brake operation, are determined independently of one another by an artificial neural network in each case, for example the GRNN 300.

The actuators of the different operating states generally have different dynamics. The release function for the estimation(s) of the dead time(s) of the longitudinal guidance may exclude the operation at excessively low acceleration gradients and/or at a standstill, and in the event of irregularities in the acceleration curve, for example, as during shift processes.

In embodiments of the determination and compensation of the dead time of the longitudinal dynamics, the time constant of an actuator function defined as a PT1 element is estimated in the transfer function (1). The target value signal vector is applied to a database having differently modeled PT1 elements. The stored PT1 actuator function having the least deviation from the measured actual curve specifies the estimated value of the time constant of the PT1 element.

In non-limiting embodiment of the method 100 for determining and compensating for the dead time of the longitudinal dynamics, the method 100 uses longer sequences of recorded past values than the estimated dead time, $T_d \gg T_{T,a}$, wherein the input vectors are divided in a preprocessing step into ranges in which the parameters contained in the transfer function, for example according to equation (1), are observable particularly well. Subsequently, the studied overall range and the individual parameters of associated partial ranges are divided into discrete support points. Networks assigned to each of the sampling vectors or the input vectors can be trained online, in that—as described for the dead time and the PT1 time constant—reference models are used. In embodiments, the method can be trained offline by means of more complex reference models and carrying out certain reference maneuvers, such as a jump specification of target accelerations, and stored in the model.

According to one non-limiting embodiment of the determination and compensation for the dead times of the longitudinal dynamics, the regulation has a PID controller, which, along a given reference trajectory X=[x, v, . . . ]$^T$, determines a defined target prediction $\Delta x$ (difference of current position on the actual trajectory and point of the prediction or reference trajectory) as a function of the velocity v, which is in turn converted into a target acceleration, by which the vehicle reaches the desired value v, of the velocity at the point $x_v$. The dead time of the actuator, for example of the longitudinal guidance, can be taken into consideration in that the following approach is selected for the prediction:

$$x_v=v\cdot(t_v+T_{T,a}).$$

In one non-limiting embodiment, which is combinable with any other embodiment, the transfer function, for example according to equation (1), may include a compensation transfer function of the following form, the transfer zero point $T_k$ of which compensates for the transfer pole of the actuator transfer function:

$$G_K(s) = \frac{a_{R,k}(s)}{a_R(s)} = \frac{T_k s + 1}{(T_{A,a}s + 1)^2}$$

For example, the lag of the actuators of the longitudinal dynamics in the dynamic model can be taken into consideration by the compensation transfer function. The compensation transfer function can also be referred to as lag compensation or lead lag compensation.

In embodiments, a PID controller and a compensation transfer function are combined.

According to another embodiment provided in accordance with the present disclosure, combinable with all preceding exemplary embodiments, of the determination and compensation for the dead times of the longitudinal guidance, the regulation is implemented by means of a model-predictive approach and specifies target accelerations $a_{soll}=[\alpha_{soll,1}, \ldots a_{soll,p}]$ for each of the following p time steps. Similarly to determining and compensating for the dead time of the transverse guidance, the compensation function of the longitudinal dynamics consists of expanding the model-predictive regulator in such a way that in accordance with the estimated dead time, in embodiments of the longitudinal dynamics, the manipulated variables or target variables $[\alpha_{soll,1}, \ldots \alpha_{soll,TTa-1}]$ not yet implemented by the actuator are stored. TTa denotes here the specification which was selected on the basis of the dead time compensation of the longitudinal dynamics. Before the regulator is called up in the next time step, the vehicle state used thereby, in embodiments the locating by means of model-supported forward integration, is corrected accordingly.

One non-limiting embodiment of the present disclosure includes a device and a method executed by the device, in which on the basis of items of information stored at the runtime, with the aid of suitable methods, dynamic effects not taken into consideration are ascertained in the form of suitable parameters and provided to the planning algorithm and/or the regulation. A significant improvement of the regulating accuracy in the trajectory following is achieved by ascertaining suitable parameters in the dynamic model of the transverse guidance and/or the longitudinal guidance. In embodiments, the present disclosure provides a device and a method for estimating nonlinearities in the dynamics of a vehicle for adapting movement planning algorithms and following regulation algorithms for an at least partially automated vehicle. The present disclosure optimizes the guidance behavior of the following regulation.

Although the present disclosure has been described in reference to a preferred embodiment, it is obvious to a person skilled in the art that various changes can be performed and equivalents can be used as a replacement. Furthermore, many modifications can be performed to adapt a certain driving situation or a certain intended use to the teaching of the present disclosure. The present disclosure is therefore not restricted to the disclosed embodiments, but includes all embodiments which fall within the scope of the appended patent claims.

LIST OF REFERENCE SIGNS 100 method
102 acquiring an actual value
104 storing the actual value
106 determining a dead time of an actuator
108 regulating the dead time of the actuator
200 device
202 sensor/sensor interface
204 storage unit
206 determination unit
208 regulation unit
300 artificial neural network
302 input variable u
304 output value ŷ
306 activation parameter ξ
308 square of Euclidean distance between input variable and center of gravity of the radial base function $C_i$
310 width of the activation function δ
312 activation function $A_i$
314 weighting factor Θ
316 weighted summation Σ
318 norming ÷
320 weighted and normed summation X
400 deviation of the transverse coordinate as a function of time
402 time axis
404 lateral axis
406 deviation of the transverse coordinate for a dead time of 0.42 s
408 deviation of the transverse coordinate for a dead time of 0.35 s
500 model-predictive regulation
502 longitudinal coordinate
504 transverse coordinate
506 point on the actual trajectory
508 point on the target trajectory
510 vehicle

What is claimed is:

1. A device for determining and compensating for a dead time of at least one actuator for the transverse guidance or longitudinal guidance of a motor vehicle, comprising:
    at least one sensor or at least one sensor interface for acquiring at least one actual value of a movement state of the transverse guidance or longitudinal guidance;
    a determination unit configured to determine the dead time of the at least one actuator by comparing at least one target value of the movement state calculated from a dynamic model of the transverse guidance or longitudinal guidance of the motor vehicle to the at least one acquired actual value; and
    a regulation unit configured to regulate the at least one actuator in dependence on the at least one acquired actual value of the movement state and the determined dead time of the at least one actuator, wherein the regulation unit outputs control signals chronologically leading by the dead time to the at least one actuator
    wherein the determination unit or the regulation unit is configured to predictively calculate a time series of N future target values of the movement state by means of the dynamic model, wherein N is a natural number, and wherein the determination unit determines the dead time on the basis of a chronological position of that target value in the time series which has a minimal deviation from the acquired actual value of the movement state.

2. The device as claimed in claim 1, further comprising: a storage unit configured to store the at least one acquired actual value and output it to the determination unit.

3. The device as claimed in claim 1, wherein the at least one sensor or the at least one sensor interface includes a receiving module for receiving signals of a global navigation satellite system.

4. The device as claimed in claim 3, wherein the receiving module is configured to receive differential correction signals of the global navigation satellite system.

5. The device as claimed in claim 1, wherein the dynamic model includes a kinematic single-track model and the movement state comprises a steering angle of a wheel and an absolute value of the velocity of the motor vehicle, wherein the determination unit is configured to estimate a value of a virtual wheelbase of the kinematic single-track model and the regulation unit regulates the at least one actuator in dependence on the estimated virtual wheelbase, wherein the determination unit includes an artificial neural network for estimating the virtual wheelbase, the input space of which includes a transverse acceleration, a steering wheel angle, a yaw rate, or a curvature of the trajectory of the motor vehicle.

6. The device as claimed in claim 1, wherein the dynamic model includes skew rigidities at front and rear axle, center of gravity distances of front and rear axle, a mass of the motor vehicle, or a moment of inertia around a vertical axis of the motor vehicle as parameters.

7. The device as claimed in claim 1, wherein the time series of N future target values of the movement state includes a time series of N future target values of the steering angle or the acceleration.

8. The device as claimed in claim 7, wherein the acquired actual value of the movement state includes the acquired actual value of the steering angle or the acceleration.

9. The device as claimed in claim 1, wherein the dead time is calculated by means of an artificial neural network.

10. The device as claimed in claim 1, wherein a transfer function of the dynamic model of the transverse guidance or longitudinal guidance comprises a PT1 element as a factor, and wherein the determination unit is configured to determine the PT1 element of the transfer function from a list of PT1 elements in that the at least one target value calculated from the dynamic model is compared to the at least one acquired actual value.

11. The device as claimed in claim 1, wherein a transfer function of the dynamic model of the transverse guidance or longitudinal guidance comprises a PD1 element as a factor, and wherein the determination unit and the regulation unit are configured to determine or compensate for a lag of the actuator by means of the PD1 element.

12. The device as claimed in claim 1, wherein the transverse guidance or the longitudinal guidance includes a following regulation for a vehicle in a vehicle group.

13. The device as claimed in claim 1, wherein the determination unit or the regulation unit is designed to change model parameters of the dynamic model during the driving operation or includes at least one interface for changing model parameters of the dynamic model during the driving operation.

14. The device as claimed in claim 1, wherein an estimation of parameters of the dynamic model is adapted in dependence on a recognized driving operating state.

15. The device as claimed in claim 1, wherein model parameters of the dynamic model are initialized using initial values that are measured or determined outside the driving operation.

16. A method for determining and compensating for a dead time of at least one actuator for the transverse guidance or longitudinal guidance of a motor vehicle, comprising:

acquiring at least one actual value of a movement state of the transverse guidance or longitudinal guidance by means of at least one sensor or at least one sensor interface;

determining a dead time of the at least one actuator by comparing at least one target value of the movement state calculated from a dynamic model to the at least one acquired actual value; and regulating the dead time of the at least one actuator in dependence on the acquired actual state, wherein a regulation unit of the transverse guidance or longitudinal guidance outputs control signals chronologically leading by the dead time to the actuator; and calculating a time series of N future target values of the movement state by means of the dynamic model, wherein N is a natural number, and wherein a determination unit determines the dead time on the basis of a chronological position of that target value in the time series which has a minimal deviation from the at least one acquired actual value of the movement state.

17. The method of claim 16, wherein determining and compensating for a dead time of one actuator includes determining and compensating for a dead time of at least one actuator for the transverse guidance or longitudinal guidance of a utility vehicle.

18. A motor vehicle, comprising at least one actuator for transverse guidance or longitudinal guidance; and a device for determining and compensating for a dead time of the at least one actuator, including:

at least one sensor or at least one sensor interface for acquiring at least one actual value of a movement state of the transverse guidance or longitudinal guidance;

a determination unit configured to determine the dead time of the at least one actuator by comparing at least one target value of the movement state calculated from a dynamic model of the transverse guidance or longitudinal guidance of the motor vehicle to the at least one acquired actual value; and a regulation unit configured to regulate the at least one actuator in dependence on the at least one acquired actual value of the movement state and the determined dead time of the at least one actuator, wherein the regulation unit outputs control signals chronologically leading by the dead time to the at least one actuator;

wherein the determination unit or the regulation unit is configured to predictively calculate a time series of N future target values of the movement state by means of the dynamic model, wherein N is a natural number, and wherein the determination unit determines the dead time on the basis of a chronological position of that target value in the time series which has a minimal deviation from the acquired actual value of the movement state.

* * * * *